Dec. 9, 1941.  J. T. LAWRENCE  2,265,912
RECOIL AIR-PRESSURE BEATER
Filed Oct. 31, 1940  2 Sheets-Sheet 1

Inventor
John T. Lawrence

Dec. 9, 1941.  J. T. LAWRENCE  2,265,912
RECOIL AIR-PRESSURE BEATER
Filed Oct. 31, 1940  2 Sheets-Sheet 2
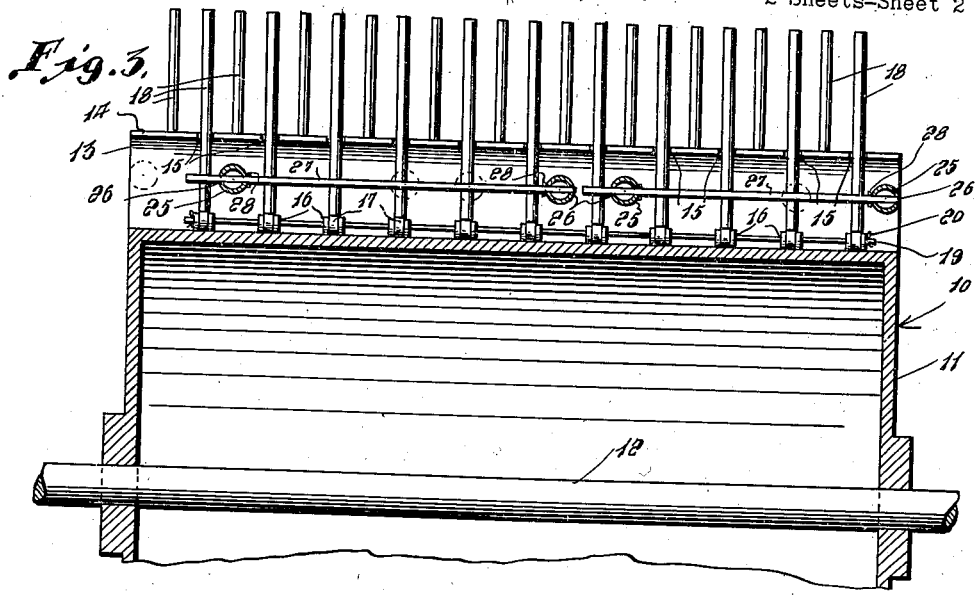
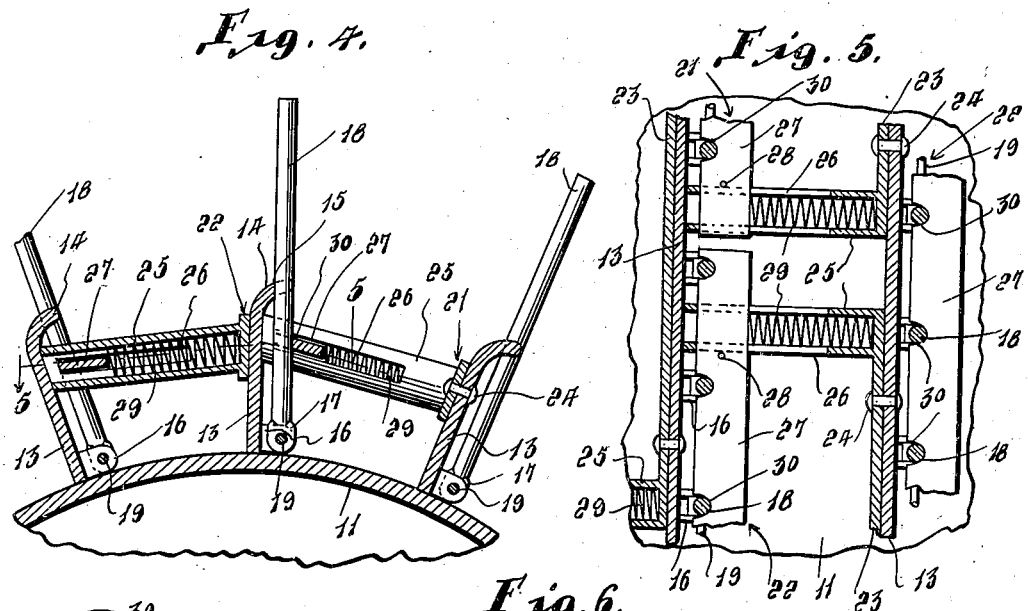
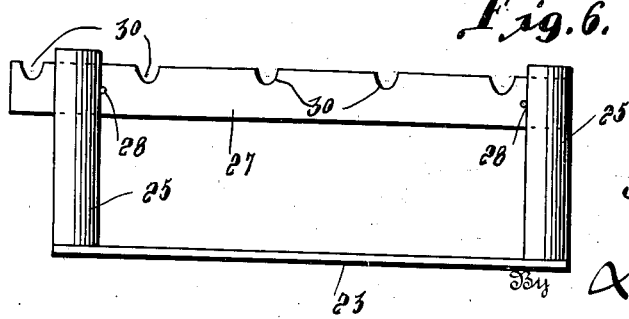
Inventor
John T. Lawrence
Attorney Patented Dec. 9, 1941

2,265,912

UNITED STATES PATENT OFFICE 2,265,912

RECOIL AIR-PRESSURE BEATER

John T. Lawrence, Inman, S. C.

Application October 31, 1940, Serial No. 363,775

8 Claims. (Cl. 19—94)

This invention relates to an improved rotary beater particularly adapted for use in beating cotton for breaking up the bolls and for separating the lint cotton from foreign matter, or which is likewise well adapted for use on threshing machines and various other machines employing a beater of this type.

More particularly, it is an aim of the invention to provide a novel rotary beater equipped with yieldably mounted means for flailing cotton or other materials and having means for directing air centrifugally from the beater for cleaning the flail members of the cotton or other materials being beat thereby.

A further object of the invention is to provide a cotton beater or beater otherwise used having pivotally mounted tines or spikes and means for yieldably supporting the spikes to permit them to yield in a direction opposite to the direction of movement of the beater.

Other objects and advantages of the invention will hereinafter become more fully apparent from the following description of the drawings, which illustrate a preferred embodiment thereof, and wherein.

Figure 1:
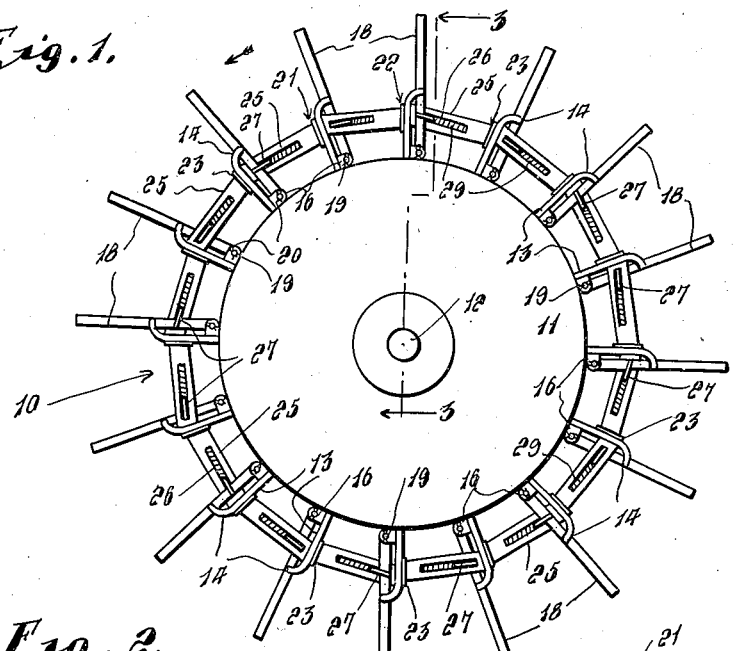
Figure 1 is an end view in elevation of the beater.
Figure 2:
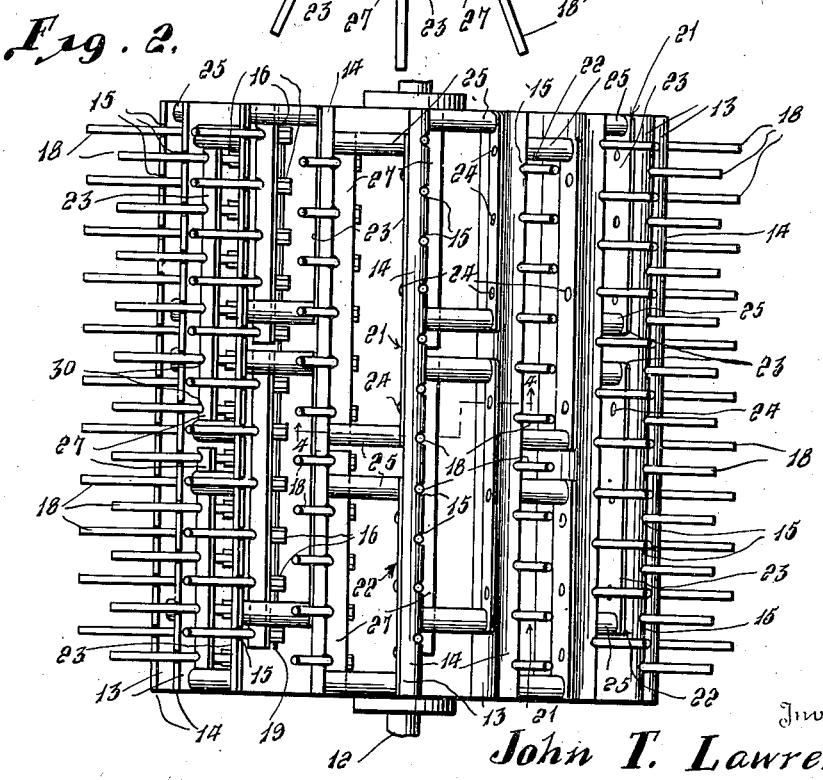
Figure 2 is a top plan view of the same.

Figure 3 is a transverse sectional view taken substantially along the plane of the line 3—3 of Figure 1, Figure 4 is a fragmentary vertical sectional view taken substantially along the plane of the line 4—4 of Figure 2, Figure 5 is a longitudinal horizontal sectional view taken substantially along the plane of the line 5—5 of Figure 4, and Figure 6 is a plan view showing one of the resilient members detached.

Referring more particularly to the drawings, wherein like reference characters designate like or corresponding parts throughout the different views, 10 designates generally the beater comprising the invention and which includes a drum 11 which is keyed to a rotary shaft 12. A plurality of blades 13 are fixedly secured to the periphery of the drum 11 and project radially therefrom. The blades 13 are disposed crosswise of the drum 11 and in circumferentially spaced apart relationship relatively to one another. The beater 10 is adapted to be revolved by rotation of the shaft 12 in a counterclockwise direction, as seen in Figure 1, and the outer edges of the blades 13 are curved or flared as seen at 14 in a clockwise direction or in a direction opposite to the direction of rotation of the beater, for a purpose which will hereinafter be described. The curved edges 14 are provided with spaced notches 15, the notches 15 of adjacent blades 13 being arranged in staggered relationship.

The blades 13 on their trailing sides, and adjacent their secured edges, are provided with outwardly projecting pairs of apertured ears 16, each of which pairs of ears 16 is disposed beneath a notch 15. Each of the pairs of ears 16 is adapted to receive an apertured end 17 of a tine or spike 18. The apertures of the ears 16 of each of the blades 13 are disposed in alinement with the apertures of the ends 17 which are mounted therein and in alinement with one another to receive rods 19, one of which is associated with each of the blades 13 and extends through each of the ears 16 thereof. The rods 19 are retained in position in the ears 16 by means of cotter pins or other fastenings 20 which engage openings, not shown, in the ends of the rods 19. Rods 19 are loosely disposed in the apertures of the ears 16 and of the ends 17 for pivotally mounting the tines 18 to permit them to swing from radial positions, as seen in Figure 1, in a clockwise direction or in a direction opposite to the direction of rotation of the beater. It will thus be apparent that the tines 18 are arranged in staggered circumferential rows.

A yieldable device 21 and a yieldable device 22 are attached to the leading side of each of the blades 13 and project forwardly therefrom. The yieldable devices 21 and 22 each includes an elongated strip or plate 23 which is fastened by means of fastenings 24 to the forward side of a blade 13 lengthwise thereof. The yieldable devices 21 and 22 of each of the blades 13 are arranged in end to end relationship relatively to one another. A cylinder 25 is secured to and projects forwardly from each end of each of the strips 23, said cylinders being provided with alined longitudinally disposed slots 26. The slots 26 of the different cylinders 25 of each of the strips 23 are likewise disposed in alinement to receive end portions of bars 27. The open, free ends of the cylinders 25 preferably abut against the trailing sides of the blades 13 which are directly in front of the blades 13 on which the cylinders are mounted, as best seen in Figure 4. The bars 27 are provided with pins 28 for engaging the outer sides of the cylinders 25, through which they extend, for preventing transverse movement of the bars 27 relatively to the cylinders 25. Bars 27 are loosely disposed in the slots 26 to permit them to slide longitudinally of the cylinders 25 which are provided with expansion coil springs 29 which are disposed behind the bars 27 for urging them outwardly of the cylinders 25. The outer edges of the bars 27 are provided with spaced notches 30 for engaging the tines 18 for urging the tines in a counterclockwise direction, as seen in Figure 1, and into position in the notches 15. With reference to Figure 2, it will be noted that the strips 23 and the bars 27 of the yieldable devices 21 are longer than the strips 23 and the bars 27, respectively, of the yieldable devices 22 and that the bars 27 of the yieldable devices 21 are provided with six equally spaced notches 30 while the bars 27 of the yieldable devices 22 are provided with five similarly spaced notches 30. It will be readily noted that the yieldable devices 21 and 22 are alternately arranged in opposite ends of adjacent blades 13 and are therefore arranged in staggered relationship circumferentially to properly position them to engage the staggeredly arranged transverse rows of tines 18.

From the foregoing it will be obvious that when the beater 10 is in operation and revolving in a counterclockwise direction, as seen in Figure 1, that when cotton or other material comes into contact with the tines or spikes 18 if in sufficient quantity the tines 18 will swing in a clockwise direction thereby retracting the bars 27 and compressing the springs 29 to compensate for the excess pressure thereon to thereby prevent the tines from being broken or damaged. As the cotton is hurled centrifugally from the tines 18 bars 27 will be projected by the springs 29 to swing the tines 18 outwardly and back to their positions, as seen in Figure 1, and when this occurs simultaneously with the discharge of cotton or other material onto the tines thus being moved a flailing action on the cotton or other material will be produced. The curved edges 14 in addition to forming stops for limiting the movement of the tines 18 in one direction, also act to impel air centrifugally from the blades 13 and outwardly along the tines 18 for cleaning the tines of cotton or other material and other foreign matter which might otherwise adhere thereto. The yieldable mounting of the tines 18 also prevents them from being broken or damaged should they accidentally come in contact with other foreign matter or obstructions which would otherwise break off the tines or possibly demolish the beater.

Various modifications and changes are contemplated and may obviously be resorted to as only a preferred embodiment of the invention has been disclosed.

I claim as my invention:

1. A beater comprising a revolving member, a plurality of blades fixed to and projecting radially from said member, said blades each being longitudinally disposed relatively to the member and circumferentially spaced relatively to one another, and flail members pivotally connected to said blades, adjacent their inner ends, and projecting outwardly therefrom, beyond their outer ends.

2. A device as in claim 1, comprising means for yieldably mounting said flail members relatively to said blades.

3. A device as in claim 1, the outer edges of said blades being curved in the opposite direction to the direction of rotation of the beater to form impellers for impelling air centrifugally from the beater for cleaning the flail members.

4. A beater comprising a rotatable cylinder, blades fixed to said cylinder and projecting radially therefrom, said blades being disposed crosswise of the cylinder and in circumferentially spaced apart relationship to one another, a plurality of tines pivotally connected to each of said blades and projecting outwardly therefrom, and means for yieldably mounting the tines to permit them to yield in a direction opposite to the direction of rotation of the beater.

5. A device as in claim 4, said yieldable means comprising cylinders secured to the forward sides of said blades and projecting forwardly therefrom, bars slidably mounted in said cylinders for engaging said tines, and spring means disposed in the cylinders and engaging and urging the bars outwardly thereof.

6. A device as in claim 4, the free edges of said blades being flared or curved in the opposite direction to the direction of rotation of the beater, and said flared edges being notched to receive the tines.

7. A beater comprising a revolving drum, blades fixed to and projecting outwardly from the drum and disposed in circumferentially spaced apart relationship to one another, said blades being arranged crosswise of the drum, the outer edges of said blades being curved in a direction opposite to the direction of rotation of the beater, said curved edges being provided with spaced notches, tines pivotally connected to said blades on the trailing sides thereof and projecting radially from the drum, said tines being arranged to engage said notches, said tines being arranged in staggered circumferential rows, and means yieldably engaging said tines for permitting the tines to yield in a direction opposite to the direction of rotation of the beater.

8. A device as in claim 7, said yieldable means comprising a pair of strips fastened to the leading side of each of said blades and longitudinally thereof, cylinders projecting forwardly from said strips, each of said cylinders being provided with longitudinal slots, bars slidably mounted in the slots of said cylinders, each of said bars being notched for engaging a portion of a transverse row of said tines, and spring means for urging said bars outwardly of the cylinders for urging the tines into radial positions relatively to the drum.

JOHN T. LAWRENCE.